(12) United States Patent
Shen

(10) Patent No.: US 8,464,357 B2
(45) Date of Patent: Jun. 11, 2013

(54) METHODS AND SYSTEMS FOR FINGERPRINT-BASED COPYRIGHT PROTECTION OF REAL-TIME CONTENT

(75) Inventor: Paul Shen, Woodside, CA (US)

(73) Assignee: TVU Networks Corporation, Mountain View, CA (US)

( * ) Notice: Subject to any disclaimer, the term of this patent is extended or adjusted under 35 U.S.C. 154(b) by 362 days.

(21) Appl. No.: 12/819,452

(22) Filed: Jun. 21, 2010

(65) Prior Publication Data

US 2011/0004944 A1    Jan. 6, 2011

Related U.S. Application Data

(60) Provisional application No. 61/269,492, filed on Jun. 24, 2009.

(51) Int. Cl.
*H04L 29/06*      (2006.01)
*H04N 7/16*      (2011.01)

(52) U.S. Cl.
USPC ................................ 726/27; 726/1; 725/25

(58) Field of Classification Search
None
See application file for complete search history.

(56) References Cited

U.S. PATENT DOCUMENTS

| | | | |
|---|---|---|---|
| 7,363,278 B2 * | 4/2008 | Schmelzer et al. | 705/67 |
| 7,565,327 B2 * | 7/2009 | Schmelzer | 705/67 |
| 7,707,088 B2 * | 4/2010 | Schmelzer | 705/35 |
| 7,707,224 B2 * | 4/2010 | Chastagnol et al. | 707/783 |
| 7,788,684 B2 | 8/2010 | Petrovic et al. | |
| 8,094,872 B1 * | 1/2012 | Yagnik et al. | 382/100 |
| 8,180,920 B2 * | 5/2012 | Mills et al. | 709/238 |
| 2002/0099555 A1 | 7/2002 | Pitman et al. | |
| 2002/0168082 A1 | 11/2002 | Razdan | |
| 2004/0009763 A1 | 1/2004 | Stone et al. | |
| 2004/0025176 A1 | 2/2004 | Franklin et al. | |
| 2005/0154681 A1 | 7/2005 | Schmelzer | |
| 2008/0091845 A1 * | 4/2008 | Mills et al. | 709/246 |
| 2008/0109369 A1 | 5/2008 | Su et al. | |
| 2008/0256647 A1 * | 10/2008 | Kim et al. | 726/32 |
| 2009/0328237 A1 * | 12/2009 | Rodriguez et al. | 726/32 |
| 2010/0262488 A1 * | 10/2010 | Harrison et al. | 705/14.46 |
| 2010/0263020 A1 * | 10/2010 | Harrison et al. | 726/1 |
| 2011/0061110 A1 * | 3/2011 | Koeten et al. | 726/28 |
| 2012/0046724 A1 * | 2/2012 | Norlin Weissenrieder | 607/120 |
| 2012/0110043 A1 * | 5/2012 | Cavet et al. | 707/825 |
| 2012/0124638 A1 * | 5/2012 | King et al. | 726/1 |

\* cited by examiner

*Primary Examiner* — Christopher Revak
(74) *Attorney, Agent, or Firm* — Lipsitz & McAllister, LLC

(57) ABSTRACT

The present invention provides methods and systems for fingerprint-based copyright protection of real-time content. A first fingerprint is provided for content from a fingerprint ingesting device to a central server. The first fingerprint is associated with one or more business rules for the content at the central server. At least one of (a) a second fingerprint is provided for the content from a broadcast device to the central server, and (b) a third fingerprint is provided for the content from a receiving device to the central server. The first fingerprint is then compared with the at least one of the second and third fingerprints at the central server. One or more corresponding business rules may then be determined for the content based on the comparing.

24 Claims, 1 Drawing Sheet

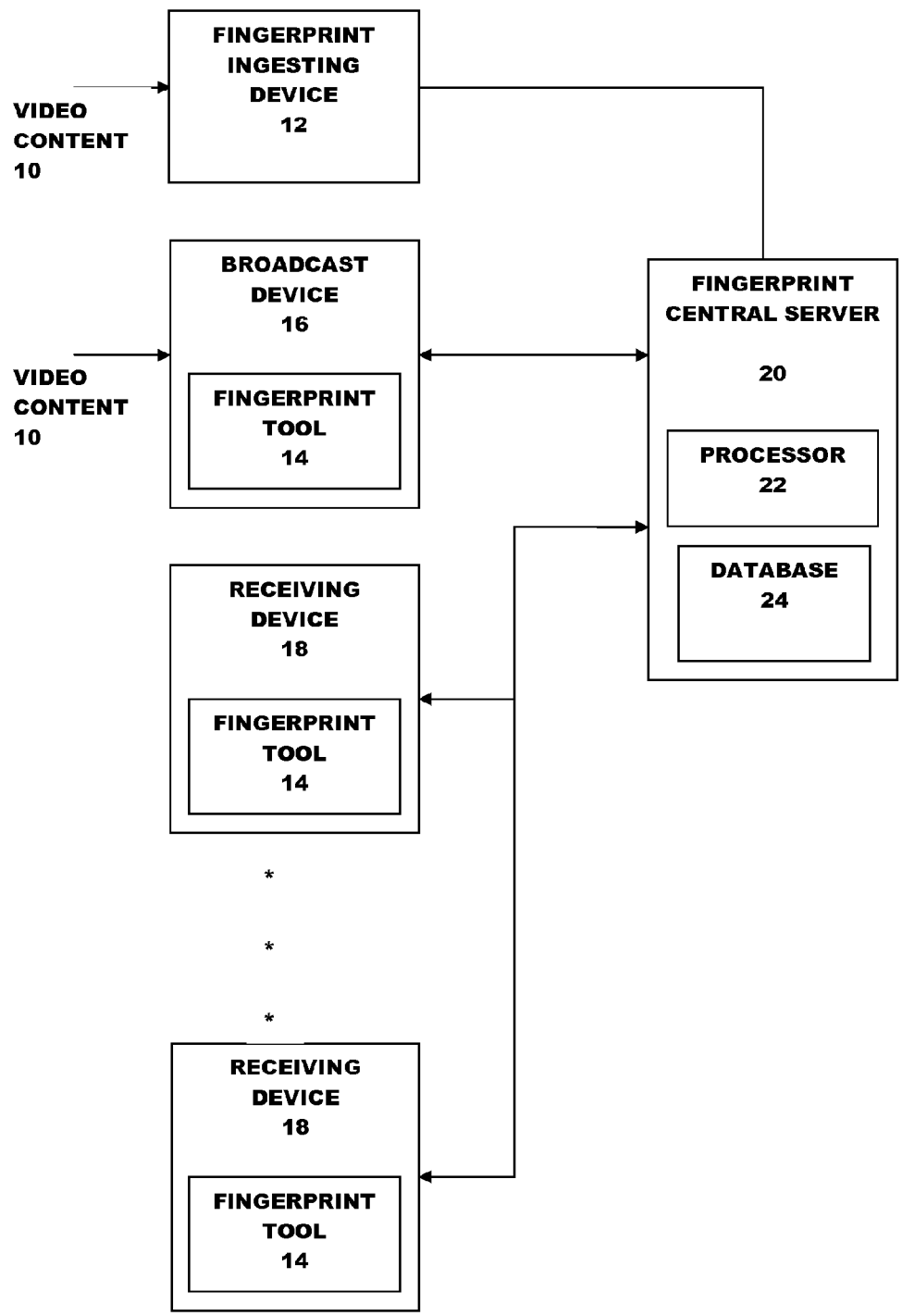

METHODS AND SYSTEMS FOR FINGERPRINT-BASED COPYRIGHT PROTECTION OF REAL-TIME CONTENT

This application claims the benefit of U.S. Provisional Application No. 61/269,492 filed on Jun. 24, 2009.

BACKGROUND OF THE INVENTION

The present invention relates to the field of copyright protection. More specifically, the present invention relates to methods and systems for fingerprint-based copyright protection of real-time audio, video, and audio-video content, such as broadcast content, multi-cast and uni-cast content, streaming content, and the like.

As low cost real-time broadcasting platforms become widespread, the problem of how to effectively manage and protect media content in real-time without human monitoring is becoming more important.

Fingerprint-based recognition systems have been developed to address the issue of non-real-time video file protection. But these existing solutions require pre-processing and pre-ingestion of content. For real-time events, such as sports and news, pre-processing and pre-ingestion of content is not possible.

It would be advantageous to provide a fingerprint-based copyright protection solution to protect real-time presentation of content. It would also be advantageous if such a solution did not require human monitoring or intervention.

The methods and systems of the present invention provide the foregoing and other advantages.

SUMMARY OF THE INVENTION

The present invention relates to methods and systems for fingerprint-based copyright protection of real-time audio, video, and audio-video content, such as broadcast content, multi-cast and uni-cast content, streaming content, and the like.

In one example embodiment of a method for copyright protection of real-time content, a first fingerprint is provided for content from a fingerprint ingesting device to a central server. The first fingerprint is associated with one or more business rules for the content at the central server. At least one of (a) a second fingerprint is provided for the content from a broadcast device to the central server, and (b) a third fingerprint is provided for the content from a receiving device to the central server. The first fingerprint is then compared with the at least one of the second and third fingerprints at the central server. One or more corresponding business rules may then be determined for the content based on the comparing.

The comparing step may be delayed for a predetermined minimal time period when the first fingerprint is not present at the central server. In the event that no matches are found for any received fingerprints, the fingerprints may be added to a database of the central server.

A broadcast channel for the content may be shut down where the first fingerprint corresponds to the second fingerprint and the one or more corresponding business rules indicate that the content is not permitted to be broadcast by the broadcast device that provided the second fingerprint. Similarly, a broadcast channel for the content may be shut down where the first fingerprint corresponds to the third fingerprint and the one or more corresponding business rules indicate that the content is not permitted to be received by the receiving device that provided the third fingerprint.

The one or more business rules may correspond to at least one of permissible and impermissible broadcast devices and receiving devices, classes of permissible and impermissible broadcast devices and receiving devices, broadcast time periods, limitations on re-broadcasting, limitations on recording, limitations on copying, and other copy-protection rules that may be apparent to those skilled in the art.

The second and third fingerprints may be created by respective fingerprint tools located at the broadcast device and the receiving device. The first, second, and third fingerprints may be based on one of the content, portions of the content, parameters of the content, and the like.

The present invention also includes systems corresponding to the above-described methods. An example embodiment of a system for copyright protection of real-time content in accordance with the present invention may comprise: a central server; a fingerprint ingesting device for providing a first fingerprint for content to the central server together with one or more business rules for the content; at least one broadcast device, each of the at least one broadcast devices adapted to provide a second fingerprint for the content to the central server; and at least one receiving device, each of the at least one receiving devices adapted to provide a third fingerprint for the content to the central server; and a processor at the central server for comparing the first fingerprint with the at least one of the second and third fingerprints at the central server and determining the one or more corresponding business rules for the content based on the comparing.

A database is provided at the central server for storing fingerprints received from the fingerprint ingesting device, the broadcast device(s), and the receiving device(s).

Corresponding fingerprint tools may be provided at each of the at least one broadcast device and the at least one receiving device for creating the second and third fingerprints.

The system embodiments of the present invention may also include various features of the method embodiments discussed above.

BRIEF DESCRIPTION OF THE DRAWINGS

The present invention will hereinafter be described in conjunction with the appended drawing FIGURE:

FIG. 1 shows a block diagram of an example embodiment of the present invention.

DETAILED DESCRIPTION

The ensuing detailed description provides exemplary embodiments only, and is not intended to limit the scope, applicability, or configuration of the invention. Rather, the ensuing detailed description of the exemplary embodiments will provide those skilled in the art with an enabling description for implementing an embodiment of the invention. It should be understood that various changes may be made in the function and arrangement of elements without departing from the spirit and scope of the invention as set forth in the appended claims.

FIG. 1 shows an example embodiment of a system for copyright protection of real-time content in accordance with the present invention. Video content 10 is provided to a fingerprint ingesting device 12 and to a broadcast device 16. The fingerprint ingesting device 12 generates a first fingerprint for content 10 and provides this first fingerprint to a central server 20. The first fingerprint is associated with one or more business rules for the content at the central server 20. At least one of (a) a second fingerprint is provided for the content from the broadcast device 16 to the central server 20, and (b) a third fingerprint is provided for the content from a receiving device 18 to the central server 20. The first fingerprint is then compared with the at least one of the second and third fingerprints at the central server 20. One or more corresponding business rules may then be determined for the content based on the comparing.

The business rules, as well as all received fingerprints, may be stored in a database 24 at the central server 20.

It should be appreciated that the broadcast device 12 shown in FIG. 1 broadcasts the video content 10 over a broadcast or other network (not shown for clarity) to the receiving devices 18 in a known manner. Although only a single broadcast device 16 is shown in FIG. 1, it should be appreciated that the system may include a plurality of broadcast devices 16. Further, the term "broadcast device" as used herein is meant to denote any type of media content distribution device, including but not limited to a traditional television broadcast device, an Internet server, a multi-cast device, a uni-cast device, a device for streaming media, or the like.

In addition, as shown in FIG. 1, a plurality of receiving devices 18 may be provided.

A fingerprint tool 14 may be provided in both the broadcast device(s) 16 and all receiving devices 18. The respective fingerprint tools 14 at the broadcast device 16 and at the receiving devices 18 operate in the same manner to compute the respective fingerprints of the broadcast content and the received content. The fingerprints may be based on, for example, the content 10, portions of the content 10, parameters of the content 10, or the like.

The first fingerprint generated by the fingerprint ingesting device 12 is a corresponding fingerprint for the content 10 which is created in the same way that the second and third fingerprints are created by the respective fingerprint tools 14 at the broadcast device 16 and the receiving devices 18. The first fingerprint may be provided from the fingerprint ingesting device 12 to the central server 20 together with information tying the fingerprint to the original content and the corresponding business rules.

In addition, it should be appreciated that any one of the broadcast device(s) 16 and/or the receiving devices 18 can function as a fingerprint ingesting device, since the fingerprint tools 14 present at the broadcast and receiving devices functions in the same manner as the fingerprint ingesting device 12.

A processor 22 may be provided at the central server 20 for carrying out the comparing step. The comparing step may be delayed for a predetermined minimal time period when the first fingerprint is not present at the central server 20. While such a delay may permit a pirate broadcaster to broadcast the content in question without authorization for a period corresponding to the delay, such a short unauthorized broadcast is acceptable to most content owners due to the low value of such a small portion of the content being broadcast in the clear. For example, there is little harm in allowing 1-2 minutes of an hour long program to be received and displayed before permission is denied by the central server 20.

In the event that no matches are found for any received fingerprints, the fingerprints may be added to the database 24 of the central server.

A broadcast channel for the content 10 may be shut down where the first fingerprint corresponds to the second fingerprint and the one or more corresponding business rules indicate that the content 10 is not permitted to be broadcast by the broadcast device 16 that provided the second fingerprint, in order to prevent unauthorized broadcasting of the content 10. Similarly, a broadcast channel for the content 10 may be shut down where the first fingerprint corresponds to the third fingerprint and the one or more corresponding business rules indicate that the content 10 is not permitted to be received by the receiving device 18 that provided the third fingerprint, to prevent unauthorized receipt of the content 10.

The one or more business rules may correspond to at least one of permissible and impermissible broadcast devices 16 and receiving devices 18, classes of permissible and impermissible broadcast devices 16 and receiving devices 18, broadcast time periods, limitations on re-broadcasting, limitations on recording, limitations on copying, and other copy-protection rules that may be apparent to those skilled in the art. Other business rules for the content, applicable to both the broadcast devices 16 and the receiving devices 18, can be imagined and are within the scope of the present invention.

It should now be appreciated that the present invention provides advantageous methods and systems for fingerprint-based copyright protection of real-time content.

Although the invention has been described in connection with various illustrated embodiments, numerous modifications and adaptations may be made thereto without departing from the spirit and scope of the invention as set forth in the claims.

What is claimed is:

1. A method for copyright protection of real-time content, comprising:
   providing a first fingerprint for content from a fingerprint ingesting device to a central server;
   associating the first fingerprint with one or more business rules for the content at the central server;
   providing at least one of (a) a second fingerprint for said content from a broadcast device to said central server, and (b) a third fingerprint for said content from a receiving device to said central server;
   comparing said first fingerprint with said at least one of said second and third fingerprints at said central server; and
   determining said one or more corresponding business rules for said content based on said comparing;
   wherein a broadcast channel for the content is shut down where the first fingerprint corresponds to the second fingerprint and the one or more corresponding business rules indicate that the content is not permitted to be broadcast by the broadcast device that provided the second fingerprint.

2. A method in accordance with claim 1, wherein the comparing step is delayed for a predetermined minimal time period when the first fingerprint is not present at the central server.

3. A method in accordance with claim 1, wherein in the event that no matches are found for any received fingerprints, said fingerprints are added to a database of the central server.

4. A method in accordance with claim 1, wherein said one or more business rules correspond to at least one of permissible and impermissible broadcast devices and receiving devices, classes of permissible and impermissible broadcast devices and receiving devices, broadcast time periods, limitations on re-broadcasting, limitations on recording, and limitations on copying.

5. A method in accordance with claim 1, wherein the second and third fingerprints are created by respective fingerprint tools located at the broadcast device and the receiving device.

6. A method in accordance with claim 1, wherein the first, second, and third fingerprints are based on one of the content, portions of the content, and parameters of the content.

7. A method for copyright protection of real-time content, comprising:
   providing a first fingerprint for content from a fingerprint ingesting device to a central server;

associating the first fingerprint with one or more business rules for the content at the central server;

providing at least one of (a) a second fingerprint for said content from a broadcast device to said central server, and (b) a third fingerprint for said content from a receiving device to said central server;

comparing said first fingerprint with said at least one of said second and third fingerprints at said central server; and determining said one or more corresponding business rules for said content based on said comparing;

wherein a broadcast channel for the content is shut down where the first fingerprint corresponds to the third fingerprint and the one or more corresponding business rules indicate that the content is not permitted to be received by the receiving device that provided the third fingerprint.

8. A method in accordance with claim 7, wherein in the event that no matches are found for any received fingerprints, said fingerprints are added to a database of the central server.

9. A method in accordance with claim 7, wherein said one or more business rules correspond to at least one of permissible and impermissible broadcast devices and receiving devices, classes of permissible and impermissible broadcast devices and receiving devices, broadcast time periods, limitations on re-broadcasting, limitations on recording, and limitations on copying.

10. A method in accordance with claim 7, wherein the second and third fingerprints are created by respective fingerprint tools located at the broadcast device and the receiving device.

11. A method in accordance with claim 7, wherein the first, second, and third fingerprints are based on one of the content, portions of the content, and parameters of the content.

12. A method in accordance with claim 7, wherein the comparing step is delayed for a predetermined minimal time period when the first fingerprint is not present at the central server.

13. A system for copyright protection of real-time content, comprising:

a central server;

a fingerprint ingesting device for providing a first fingerprint for content to the central server together with one or more business rules for the content;

at least one broadcast device, each of said at least one broadcast devices adapted to provide a second fingerprint for said content to said central server;

at least one receiving device, each of said at least one receiving devices adapted to provide a third fingerprint for said content to said central server; and a processor at said central server for comparing said first fingerprint with said at least one of said second and third fingerprints at said central server and determining said one or more corresponding business rules for said content based on said comparing;

wherein a broadcast channel for the content is shut down where the first fingerprint corresponds to the second fingerprint and the one or more corresponding business rules indicate that the content is not permitted to be broadcast by the broadcast device that provided the second fingerprint.

14. A system in accordance with claim 13, wherein the comparing step is delayed for a predetermined minimal time period when the first fingerprint is not present at the central server.

15. A system in accordance with claim 13, wherein in the event that no matches are found for any received fingerprints, said fingerprints are added to a database of the central server.

16. A system in accordance with claim 13, wherein said one or more business rules correspond to at least one of permissible and impermissible broadcast devices and receiving devices, classes of permissible and impermissible broadcast devices and receiving devices, broadcast time periods, limitations on re-broadcasting, limitations on recording, and limitations on copying.

17. A system in accordance with claim 13, further comprising a fingerprint tool located at each of the at least one broadcast device and the at least one receiving device for creating the second and third fingerprints.

18. A system in accordance with claim 13, wherein the first, second, and third fingerprints are based on one of the content, portions of the content, and parameters of the content.

19. A system for copyright protection of real-time content, comprising:

a central server;

a fingerprint ingesting device for providing a first fingerprint for content to the central server together with one or more business rules for the content;

at least one broadcast device, each of said at least one broadcast devices adapted to provide a second fingerprint for said content to said central server;

at least one receiving device, each of said at least one receiving devices adapted to provide a third fingerprint for said content to said central server; and a processor at said central server for comparing said first fingerprint with said at least one of said second and third fingerprints at said central server and determining said one or more corresponding business rules for said content based on said comparing;

wherein a broadcast channel for the content is shut down where the first fingerprint corresponds to the third fingerprint and the one or more corresponding business rules indicate that the content is not permitted to be received by the receiving device that provided the third fingerprint.

20. A system in accordance with claim 19, wherein in the event that no matches are found for any received fingerprints, said fingerprints are added to a database of the central server.

21. A system in accordance with claim 19, wherein said one or more business rules correspond to at least one of permissible and impermissible broadcast devices and receiving devices, classes of permissible and impermissible broadcast devices and receiving devices, broadcast time periods, limitations on re-broadcasting, limitations on recording, and limitations on copying.

22. A system in accordance with claim 19, further comprising a fingerprint tool located at each of the at least one broadcast device and the at least one receiving device for creating the second and third fingerprints.

23. A system in accordance with claim 19, wherein the first, second, and third fingerprints are based on one of the content, portions of the content, and parameters of the content.

24. A system in accordance with claim 19, wherein the comparing step is delayed for a predetermined minimal time period when the first fingerprint is not present at the central server.

* * * * *